United States Patent
Pretty et al.

(10) Patent No.: US 9,618,123 B2
(45) Date of Patent: Apr. 11, 2017

(54) ACORN SEAL PROFILE

(71) Applicant: ROHR, INC., Chula Vista, CA (US)

(72) Inventors: Michael Sean Pretty, El Cajon, CA (US); Joshua Elam, El Cajon, CA (US)

(73) Assignee: ROHR, INC., Chula Vista, CA (US)

( * ) Notice: Subject to any disclaimer, the term of this patent is extended or adjusted under 35 U.S.C. 154(b) by 108 days.

(21) Appl. No.: 14/250,814

(22) Filed: Apr. 11, 2014

(65) Prior Publication Data

US 2015/0292624 A1 Oct. 15, 2015

(51) Int. Cl.
*F16J 15/02* (2006.01)
*F16J 15/10* (2006.01)
*F16J 15/06* (2006.01)

(52) U.S. Cl.
CPC ........... *F16J 15/104* (2013.01); *F16J 15/027* (2013.01); *F16J 15/061* (2013.01)

(58) Field of Classification Search
CPC ........ B60J 10/08; B60J 10/081; B60J 10/085; B60J 10/0014; B60J 10/0031; F16J 15/0887; F16J 15/0893
See application file for complete search history.

(56) References Cited

U.S. PATENT DOCUMENTS

| | | | | |
|---|---|---|---|---|
| 4,860,495 A * | 8/1989 | Kessler | ............ | B60J 10/0002 49/489.1 |
| 5,581,951 A * | 12/1996 | Ryan | ............ | B60J 10/0031 49/489.1 |
| 5,771,652 A * | 6/1998 | Nagata | ............ | B60J 10/0011 296/93 |
| 2003/0051411 A1* | 3/2003 | Nozaki | ............ | B60J 10/0005 49/498.1 |
| 2004/0079032 A1* | 4/2004 | Russell | ............ | B60J 10/0042 49/498.1 |
| 2006/0201622 A1* | 9/2006 | Sehr | ............ | B29C 66/71 156/324 |
| 2006/0220328 A1* | 10/2006 | Deaver | ............ | B60J 10/0031 277/644 |
| 2007/0125003 A1* | 6/2007 | Wartzack | ............ | B60J 5/0405 49/502 |
| 2011/0099912 A1* | 5/2011 | Ohtake | ............ | B60J 5/0402 49/502 |
| 2014/0137480 A1* | 5/2014 | Sato | ............ | B60J 10/085 49/406 |
| 2014/0311040 A1* | 10/2014 | One | ............ | B60J 10/081 49/490.1 |
| 2015/0082710 A1* | 3/2015 | Hamada | ............ | B60J 10/0008 49/490.1 |

OTHER PUBLICATIONS

Office Action dated Jun. 1, 2015 in French Application No. 15 53004.

* cited by examiner

*Primary Examiner* — Gilbert Lee
(74) *Attorney, Agent, or Firm* — Snell & Wilmer, L.L.P.

(57) ABSTRACT

A seal comprising a generally acorn shaped cross-sectional profile is described herein. The seal may be configured for use between two generally adjoining and/or nearly adjoining surfaces. The seal may be used to eliminate a gap or rubbing between a plurality of surfaces. The seal may have a non-circular cross-sectional interior profile.

9 Claims, 6 Drawing Sheets

ACORN SEAL PROFILE

FIELD

The present disclosure relates to a seal between a plurality of surfaces.

BACKGROUND

Seals may be used between two adjoining surfaces (and/or surfaces having a gap between) to help prevent the flow of air, liquid, and other undesired elements from traveling through the gap otherwise appearing between the two surfaces. However, the footprint of these seals may be required to be located within exacting constraints. Often times, a standard circular cross sectional profile (See FIG. 1) omega seal may not fit within the package constraints of an application. It would be desirable for a seal to be designed to meet the performance needs of various applications, while maintaining a reduced footprint on the seal landing/depressor and/or on the seal attach surface within design specifications.

SUMMARY

A seal comprising a generally acorn shaped cross-sectional profile is disclosed herein. Moreover, a seal having a non-circular cross sectional open interior profile is disclosed herein. According to various embodiments, a seal having a coupler or retainer configured to attach the seal to a first surface, an external contact surface configured to engage a second contact surface and an internal open corridor is described herein. A first curved interior surface (interior to the corridor) may be configured to deform under force to an increased angle of curvature. A second and third interior curved surface, internal to the corridor, may be configured to deform to a decreased angle of curvature. The second interior curved surface and the first interior curved surface are coupled via a substantially non-curved interior surface. The third curved surface and the first curved surface are coupled via a substantially non-curved interior surface.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
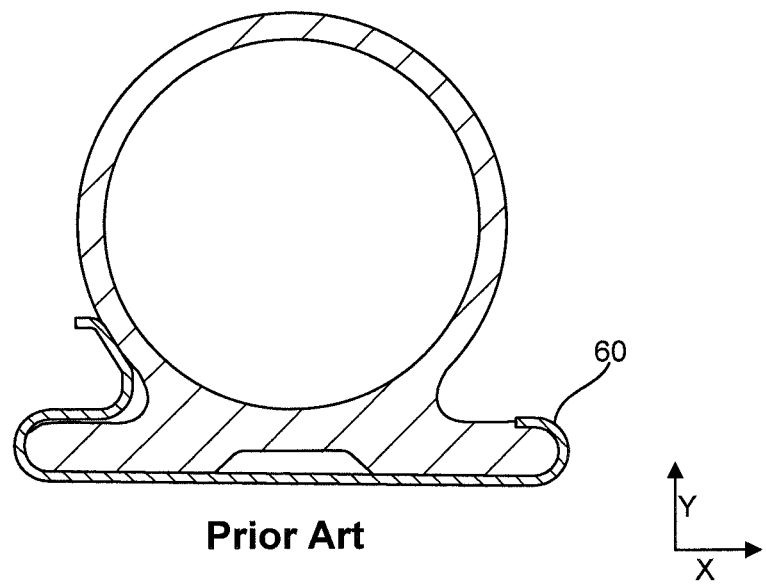
FIG. 1 illustrates a state of the art conventional omega seal.

Conventional omega seal profiles, with reference to FIG. 1, have a limited compression range (e.g., 10% to 50% of uncompressed seal diameter). In order to design for greater deflections, a larger internal diameter is needed. However, this larger diameter may exceed packaging constraints and prevent this larger deflection range. The acorn seal 110 (see FIGS. 2-3B) having a generally acorn shaped profile as described herein may act to counter this and other concerns.

Figure 2:
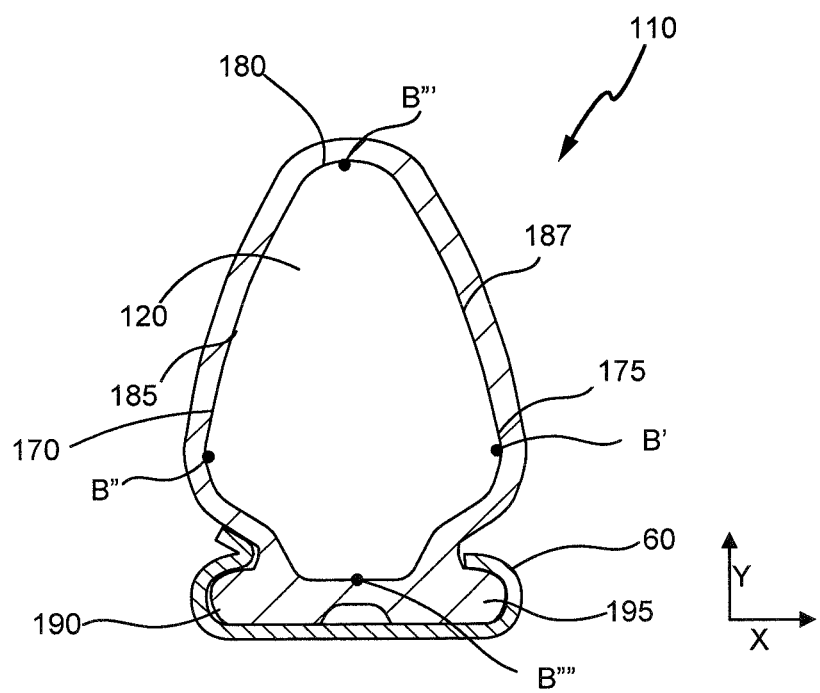
FIG. 2 illustrates a cross-sectional profile view of an acorn seal in accordance with various embodiments.

According to various embodiments and with reference to FIG. 2, a seal, configured for location between two adjoining surfaces, having a generally open interior may comprise a generally acorn shaped cross-sectional interior profile is disclosed herein. For instance, unlike "omega" seals with generally circular interiors (as depicted in FIG. 1) the presently disclosed acorn seal 110 is taller at its longest interior length (generally along the Y axis as illustrated in FIG. 2, than it is wide at its widest width (generally along the X axis as illustrated in FIG. 2). Stated another way, measuring from the midpoint of the acorn seal's 110 longest interior span from a first interior surface at location B''' to a second location B'''' (generally along the Y axis) results in a longer length than measuring from the midpoint of the acorn seal's 110 widest interior span from a third interior surface at third location B' to fourth location B'' (generally along the X axis). Acorn seal 110 may comprise at least three interior surface curves, with continued reference to FIG. 2, generally through locations 170, 175, and 180. Interior curves, unlike a "D" cross-sectional profile seal, may be greater than 90 degrees. Acorn seal 110 comprises a non-compressed generally non-circular cross-sectional internal profile. According to various embodiments, acorn seal 110 is generally symmetrical. Acorn seal 110 may be made from any desired deformable material, such as a polymer (e.g., silicon). According to various embodiments, the internal ply layup inside the silicone acorn seal 110 may be varied according to location. For example, in proximity to the top of the acorn seal 3 plys of carbon fabric may be used while 2 plys may be found in other locations. In this way, acorn seal 110 is configured to have relatively increased stiffness at the tip and/or top and designed to deform elsewhere, resulting in the desired deformed shape. (See FIGS. 4A-4F)

Figure 3A:
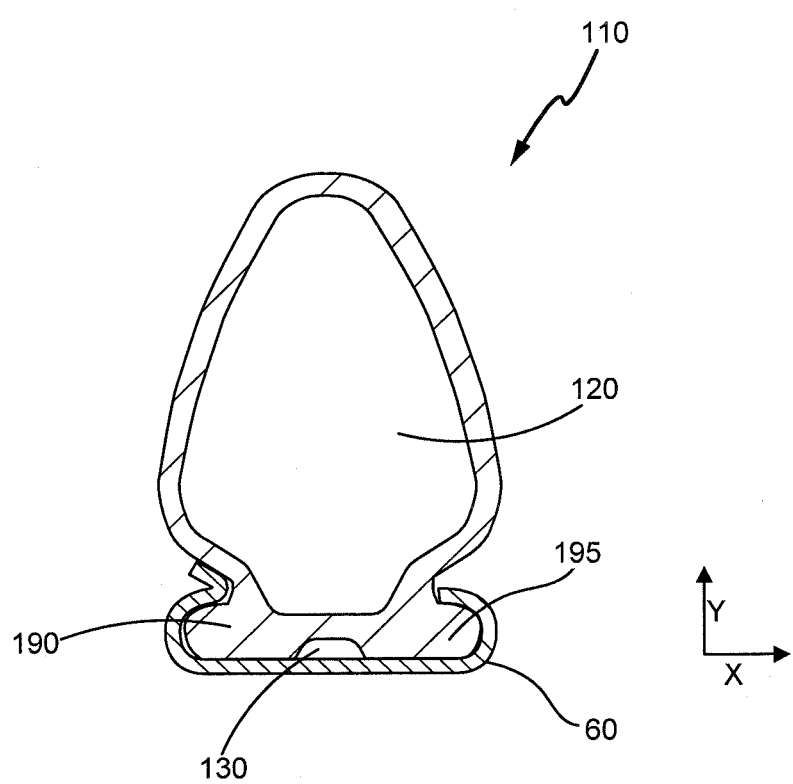
FIG. 3A illustrates a cross-sectional profile view of an acorn seal housed in a retainer in accordance with various embodiments.

As depicted in FIG. 3A, acorn seal 110 may be configured to allow for a conventional retainer 60 to be utilized to securably retain the acorn seal 110. For instance, flanges 190, 195 may be inserted into a track/retainer 60 that partially or fully wraps around each flange 190, 195. Retainer 60 may span in a direction normal to both the X and Y axis depicted in FIG. 3A. A gap 130 may be fashioned into acorn seal 110 to clear fastener heads that attach the retainer 60 to a secondary surface. Acorn seal 110 may be secured permanently and/or semi-permanently in position within retainer 60 with adhesives, mechanical fasteners, press fit, and or the like. For instance, a mechanical fastener may be inserted through the base of the Acorn seal 110, internally through the profile of the acorn seal. According to various embodiments, this may be accomplished through molding a metallic plate inside the silicone at the base of acorn seal 110 and welding studs or nutplates to acorn seal 110.

Figure 3B:
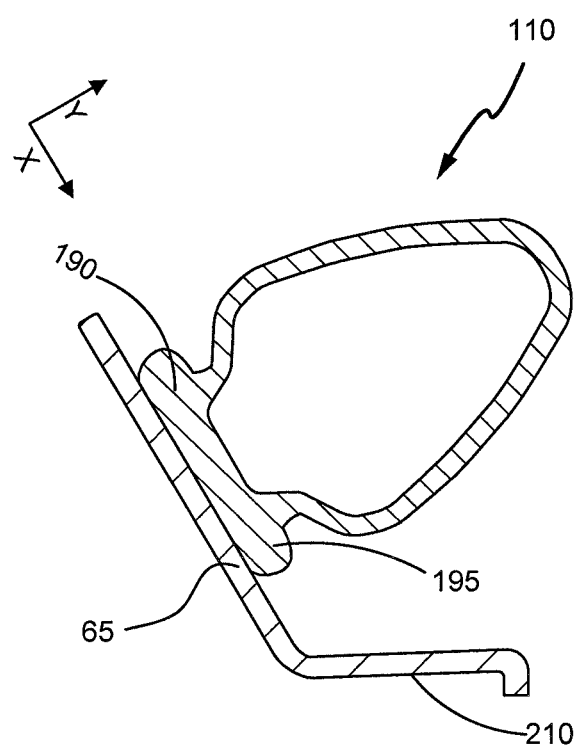
FIG. 3B illustrates a cross-sectional profile view of an acorn seal coupled to a surface utilizing a flanged attachment in accordance with various embodiments.

As depicted in FIG. 3B, acorn seal 110 may be coupled between a plurality of adjoining surfaces through any desired fashion. For instance, a flange, such as flange 65, may be coupled to acorn seal 110 to position and retain acorn seal 110 to a surface 210. Flange 65 may be any shape, and angle Acorn seal 110 in any desired direction. Flange 65 may be coupled to and/or integrally formed with Acorn seal 110. Flanges 190, 195 may be removed or maintained in flanged attachment designs as desired. A mechanical fastener may be inserted through flange 65 and/or flange 65 may be adhered and/or welded to a secondary surface as desired.

Figure 4A:
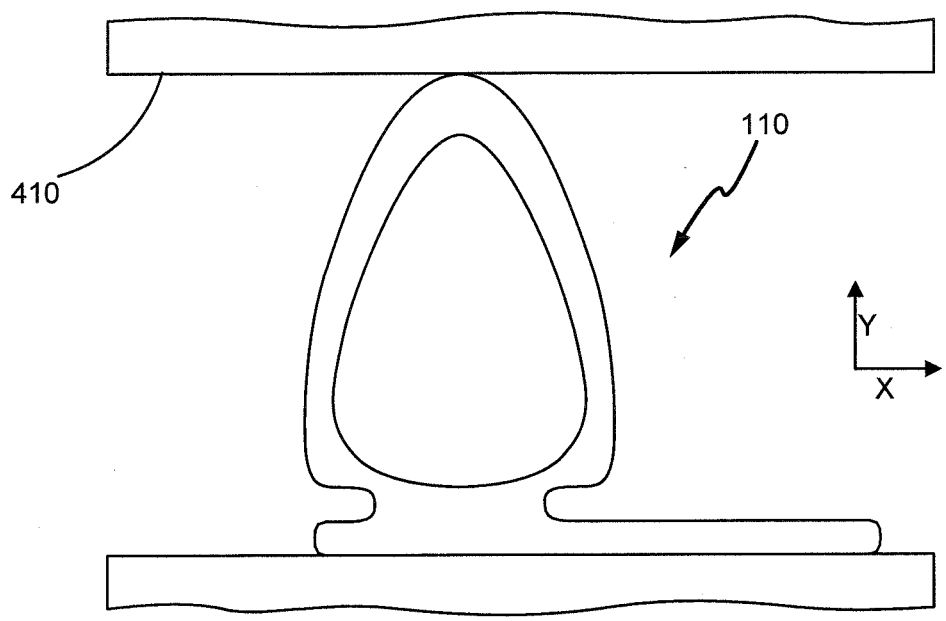
FIGS. 4A-4F illustrate the acorn seal of FIG. 2 in compression in accordance with various embodiments.
Figure 4B:
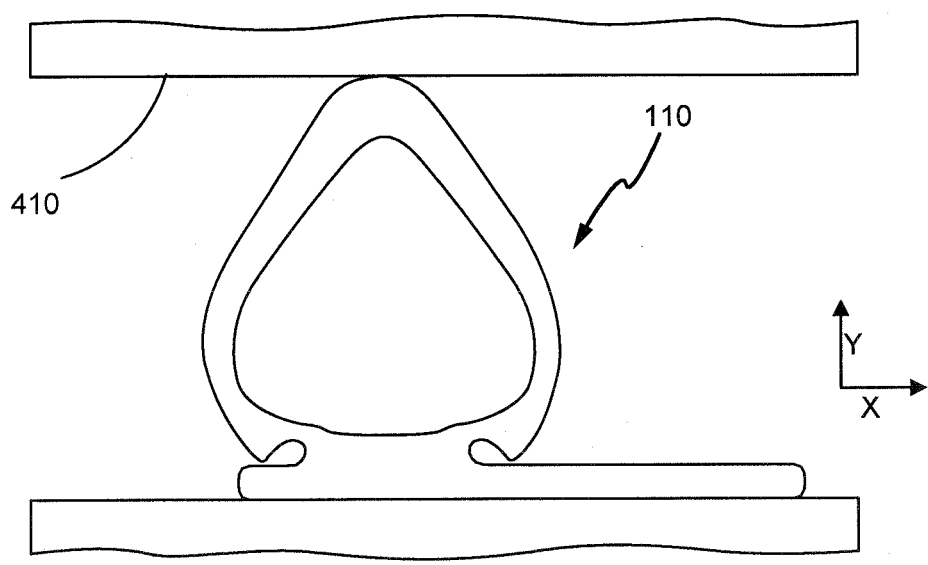
Figure 4C:
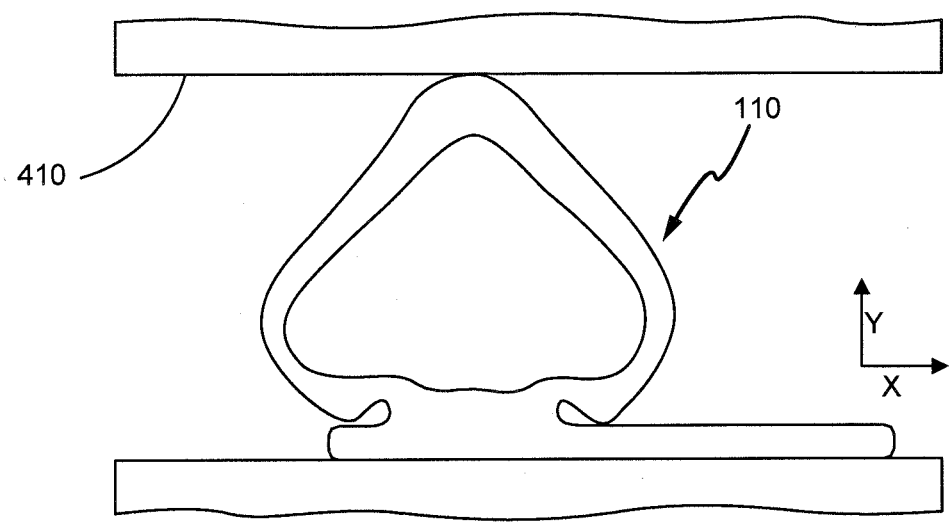
Figure 4D:
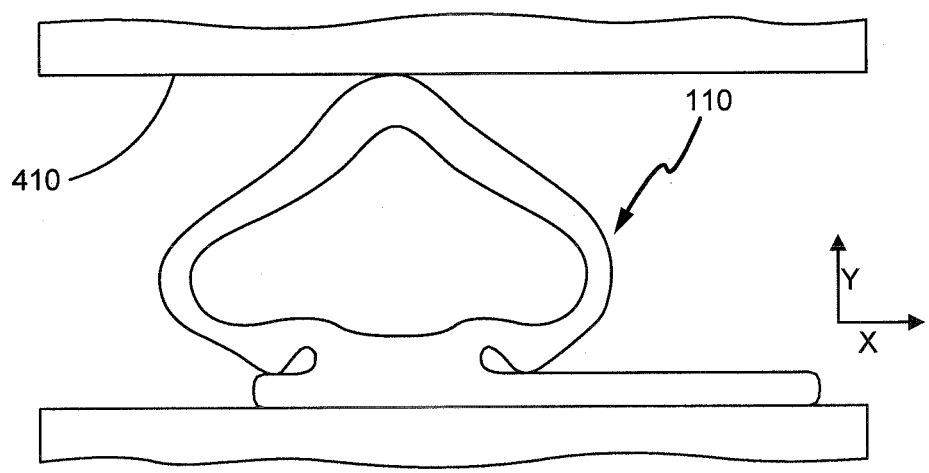
Figure 4E:
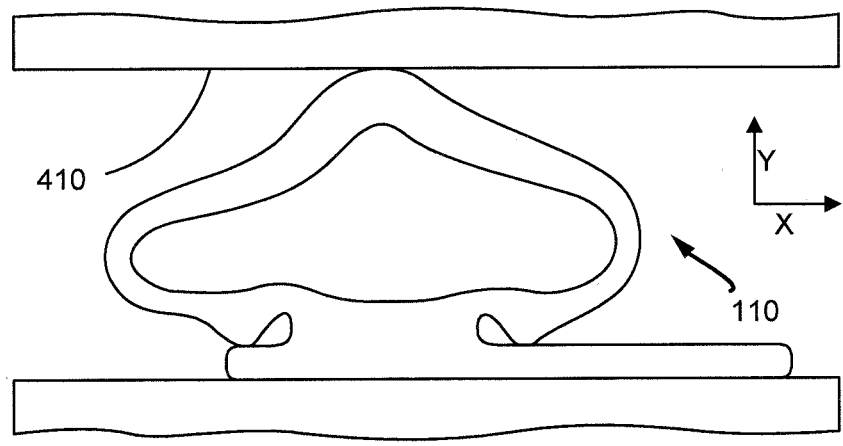
Figure 4F:
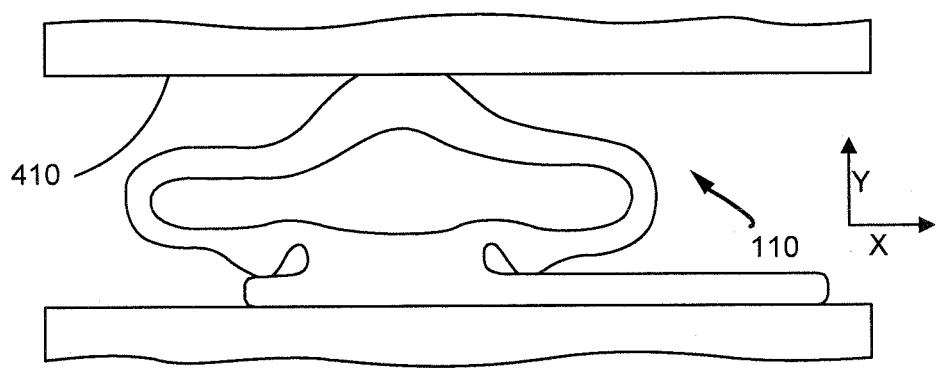

As depicted in FIGS. 4A-4F, acorn seal 110 may be configured for use at various levels of compression. Stated another way, Acorn seal 110 may compress based on force applied by a second surface 410, such as a non-mounted contact surface. For instance, according to various embodiments, FIG. 4B depicts 10% compression; FIG. 4C depicts 20% compression; FIG. 4D depicts 30% compression; FIG. 4E depicts 40% compression; and FIG. 4F depicts 50% compression. Compared to an omega seal (as shown in FIG. 1) to achieve the equivalent performance a larger diameter would be needed to achieve the compression range of the acorn seal 110. However, the width needed for this type of omega seal often exceeds the packaging constraints of the retention location. Also, for the omega seal, as the compression range changes, the contact surface on the seal depressor has a high variation, that varies in accordance with the amount of compression. In contrast, the acorn seal 110 compresses to a comparably small contact footprint. The contact footprint is reasonably linear through the 30 percent compression range. Though the preferred direction of force on the acorn seal from an adjoining contact surface is along the Y axis (see FIGS. 4A-4F) the acorn seal 110 is configured to adapt to some angularity in the depressor surface and/or direction of the applied force. The acorn seal 110 cross-sectional shape may achieve higher compression ranges whilst maintaining limited special constraints of legacy seals.

According to various embodiments, the acorn seal 110 may comprise an internal open corridor 120. A first internal curved surface 180 interior to the corridor is configured to deform under force to an increased angle of curvature. This increased angle of first internal curved surface 180 may be substantially flat. A second interior curved surface 170 and third interior curved surface 175 internal to the corridor may be configured to deform to a decreased angle of curvature. This may be between 5 and 30 degrees. The second interior curved surface 170 and the first interior curved surface 180 may be coupled (as viewed in cross-section) via a substantially non-curved interior surface 185. The third interior curved surface 175 and the first interior curved surface 180 may be coupled (as viewed in cross-section) via a substantially non-curved interior surface 187.

Acorn seal 110 may be configured as a portion of a fire seal between two compartments and/or zones. Acorn seal 110 may be configured as a performance seal, such as to prevent and/or reduce airflow or fluid flow through a gap between two adjoining and/or nearly adjoining surfaces. Acorn seal 110 may be configured for use in aerospace applications, such as a seal between two moving parts as a pressure and/or fire seal. For instance, Acorn seal 110 may be utilized as part of a thrust reverser. However, Acorn seal 110 is not limited to aerospace applications and may be applicable for use wherever a gap filler between pluralities of moving or coupled surfaces is desired. A non-limiting example may include, on elevator doors, on an access hatch, electrical components, computer server doors, windows, doorways, and/or the like.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. Different cross-hatching is used throughout the figures to denote different parts but not necessarily to denote the same or different materials. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A seal comprising:
  a coupler configured to attach the seal to a first surface;
  an external contact surface configured to engage a second contact surface; and
  an internal open corridor,
    wherein a first interior curved surface interior to the corridor is configured to deform under force to an increased angle of curvature, wherein the increased angle of curvature is substantially flat,
    wherein a second interior curved surface and a third interior curved surface internal to the corridor are configured to deform to a decreased angle of curvature ranging from 5 to 30 degrees,
    wherein the second interior curved surface and the first interior curved surface are coupled via a first substantially non-curved interior surface, and
    wherein the third interior curved surface and the first interior curved surface are coupled via a second substantially non-curved interior surface,
  wherein the internal open corridor is symmetric.

2. The seal of claim 1, wherein the seal comprises a substantially acorn shaped cross-sectional profile.

3. The seal of claim 1, wherein the seal comprises a non-circular cross-sectional profile.

4. The seal of claim 1, wherein the coupler comprises at least one of a flange and a plurality of flanges.

5. The seal of claim 4, wherein the plurality of flanges are configured to be retained by a retainer.

6. The seal of claim 5, wherein the retainer is configured to retain an Omega seal.

7. The seal of claim 1, wherein the seal is a longer measured distance at a longest interior length of the seal measured from a first interior surface location to a second interior surface location than a width of the seal at a widest width of the seal measured from a third interior surface location to a fourth interior surface location.

8. The seal of claim 7, wherein a direction of force from a contact surface is substantially along a direction of the longest interior length of the seal.

9. The seal of claim 7, wherein the widest width of the seal measured from the first interior surface location to the second interior surface location is generally in a horizontal direction, and an interior length at the longest interior length of the seal measured from the third interior surface location to the fourth interior surface location is generally in a vertical direction.

* * * * *